(12) United States Patent
Larson et al.

(10) Patent No.: US 9,606,355 B2
(45) Date of Patent: Mar. 28, 2017

(54) APPARATUS AND METHOD FOR SUPPRESSING DOUBLE IMAGES ON A COMBINER HEAD-UP DISPLAY

(71) Applicant: HONEYWELL INTERNATIONAL INC., Morristown, NJ (US)

(72) Inventors: Brent D. Larson, Phoenix, AZ (US); Kanghua Lu, Phoenix, AZ (US); Elias S. Haim, Glendale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/499,812

(22) Filed: Sep. 29, 2014

(65) Prior Publication Data

US 2016/0091716 A1     Mar. 31, 2016

(51) Int. Cl.
*G02B 27/14* (2006.01)
*G02B 27/01* (2006.01)
*G02B 5/30* (2006.01)

(52) U.S. Cl.
CPC ....... *G02B 27/0101* (2013.01); *G02B 5/3041* (2013.01); *G02B 5/30* (2013.01); *G02B 2027/012* (2013.01); *G02B 2027/013* (2013.01)

(58) Field of Classification Search
CPC .............................. G02B 27/01; G02B 27/017
USPC .................................................. 359/630, 631
See application file for complete search history.

(56) References Cited

U.S. PATENT DOCUMENTS

| | | |
|---|---|---|
| 4,723,160 A | 2/1988 | Connelly |
| 5,552,935 A * | 9/1996 | Knoll ..................... B60Q 3/042 359/13 |
| 5,805,119 A | 9/1998 | Erskine et al. |
| 6,473,240 B1 | 10/2002 | Dehmlow |
| 6,750,832 B1 | 6/2004 | Kleinschmidt |
| 6,952,312 B2 * | 10/2005 | Weber ..................... G02B 5/305 359/630 |
| 7,123,418 B2 | 10/2006 | Weber et al. |
| 7,203,005 B2 | 4/2007 | Jiang et al. |
| 8,023,052 B1 | 9/2011 | Osterman et al. |
| 8,422,112 B2 | 4/2013 | Li et al. |
| 2002/0089756 A1 | 7/2002 | Aoki et al. |
| 2004/0061819 A1 | 4/2004 | Faris et al. |
| 2004/0135742 A1 | 7/2004 | Weber et al. |

(Continued)

FOREIGN PATENT DOCUMENTS

| | | |
|---|---|---|
| DE | 20304399 U1 | 6/2003 |
| DE | 102009054232 A1 | 5/2011 |

(Continued)

OTHER PUBLICATIONS

EP Extended Search Report for Application No. 15186765.2 Dated Jan. 29, 2016.

(Continued)

*Primary Examiner* — James Jones
(74) *Attorney, Agent, or Firm* — Lorenz & Kopf, LLP

(57) ABSTRACT

A head-up display system and method are provided that suppress double images from a combiner by eliminating or reducing a reflection of a refracted image from the back surface of the combiner. The combiner contains a tilted axis polarizing structure that attenuates transmittance and subsequent reflection of a refracted polarized projector image but maintains high transmittance for the forward external scene imagery.

18 Claims, 8 Drawing Sheets

(56) References Cited

U.S. PATENT DOCUMENTS

| | | |
|---|---|---|
| 2006/0238877 A1 | 10/2006 | Ashkenazi et al. |
| 2009/0034087 A1 | 2/2009 | Hung et al. |
| 2009/0128901 A1 | 5/2009 | Tilleman et al. |
| 2009/0278765 A1 | 11/2009 | Stringfellow |
| 2010/0091027 A1 | 4/2010 | Oyama et al. |
| 2010/0092784 A1 | 4/2010 | Kamada et al. |
| 2012/0139817 A1 | 6/2012 | Freeman |
| 2013/0038803 A1 | 2/2013 | Ma et al. |
| 2014/0333510 A1 | 11/2014 | Wischmeyer |
| 2015/0022646 A1 | 1/2015 | Brooks |
| 2015/0070742 A1 | 3/2015 | Sorek et al. |

FOREIGN PATENT DOCUMENTS

| | | |
|---|---|---|
| EP | 0170523 A2 | 2/1986 |
| EP | 0296710 A2 | 12/1988 |
| EP | 2355530 A2 | 8/2011 |
| FR | 2860601 A1 | 4/2005 |
| WO | 03102666 A1 | 12/2003 |
| WO | 2006128862 A1 | 12/2006 |

OTHER PUBLICATIONS

EP Partial Search Report for Application No. EP 15187006.0 Dated Feb. 16, 2016.

USPTO Notice of Allowance, Notification Date Aug. 31, 2015; U.S. Appl. No. 14/102,950.

EP Search Report for Application No. 14193519.7 dated Apr. 8, 2015.

USPTO Office Action, Notification Date May 5, 2015; U.S. Appl. No. 14/102,950.

USPTO Office Action for U.S. Appl. No. 14/499,626 dated Aug. 2, 2016.

EP Search Report for Application No. 15187006.0-1504 / 3001236 dated May 24, 2016.

USPTO Final Office Action for U.S. Appl. No. 14/499,626 dated Nov. 28, 2016.

* cited by examiner

APPARATUS AND METHOD FOR SUPPRESSING DOUBLE IMAGES ON A COMBINER HEAD-UP DISPLAY

TECHNICAL FIELD

The present invention generally relates to head-up displays (HUDs), and more particularly relates to a HUD that suppresses (reduces or eliminates) double images from a combiner.

BACKGROUND

Head-up displays (HUDs) are becoming increasingly popular in the aerospace industry. Known HUDs typically include at least a projector, a combiner, and an image generator. The projector receives images supplied from the image generator, and the HUD will typically include an optical collimator, such as a convex lens or concave mirror, to produce an image that is perceived to be at infinity or other far distance.

The combiner reflects the image projected by the projector in such a way as to see the field of view and the projected infinity image at the same time. The combiner is typically a very precisely designed and controlled optical element and may be flat or curved. Some combiners may also have special coatings that reflect certain wavelengths of light projected onto it from the projector while allowing other wavelengths of light to pass through.

Traditional prior art HUDs typically rely on sophisticated optics to meet the performance requirements for avionic use. These performance requirements include precise angular control and uniformity over an exit pupil or head box that is large enough to encompass both eyes of a pilot or other user. As an example, the size, weight and cost of a bulky overhead unit (OHU) may be driven to a large extent by the required performance levels.

Referring to FIG. 1, a known HUD 100, for example, as included in an aircraft, includes a projector 102, and a combiner 104, for example a partially reflective element proximate the windscreen of the aircraft, that directs images 113 and 116 to a receiver 106, for example, a person's eyes. In the traditional aircraft HUD, the combiner 104 is typically a very precisely designed and controlled separate optical element, and includes a front, or inner, surface 108, and a back, or outer, surface 110. The projector 102 projects an image 112 onto the front surface 108, wherein the desired image 113 is reflected back toward the receiver 106 and some of the image 112 propagates through the combiner 104, reflecting off of the back surface 110 as a potentially undesired image 116. The images 113 and 116 can present a double image to the receiver 106 unless measures are taken to either reduce the reflectivity of back surface 110 relative to front surface 108 or to effectively align the two reflected images. The outside view 118 enters the combiner 104 at the back surface 110 and propagates through the combiner 104 to the receiver 106 combined with the reflected HUD images 113 and 116. Whereas combiner 104 has been described in this example as an optical element that is separate from and proximate the windscreen or windshield, certain vehicular HUD configurations, most notably automotive HUDs, may utilize the windshield or windscreen as the combiner rather than using a separate element. These will also involve the possibility of multiple visible reflected images.

Very often, and particularly with curved combiners, carefully designed and deposited coatings may be applied to the front and back surfaces. There are multiple objectives in selecting these coatings. One typical goal is to provide adequate reflectance of the HUD imagery while at the same time maintaining high "see-through" transmittance of the forward scene. Partially reflecting coatings would generally be applied on one of the surfaces, most commonly the front surface. Other objectives may include maximizing luminance of the HUD reflection while minimizing color tinting for the forward scene. Yet another objective may be to minimize any undesired visual artifacts associated with reflections from the rear surface of the combiner. As an example, the combiner surface might have a narrow band reflective multilayer interference coating, and the rear surface might have an anti-reflection coating of some type. However, when utilizing a vehicle windshield or windscreen as a combiner, the practicality and effectiveness of such a rear coating could be affected, for example due to rain or other contaminant buildup.

Accordingly, it is desirable to provide a HUD that suppresses double images from the combiner by eliminating or reducing a reflection of the HUD display from the back surface of the combiner. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A HUD system and method eliminates or reduces reflection of the HUD image by the back (outer) surface of a combiner.

In an exemplary embodiment, a head-up display system for overlaying a projected image onto an external scene image, the head-up display system comprising a combiner having a first surface and a second surface and including a uniaxially absorbing polarizing structure; a polarized image generation system configured to project polarized light onto the combiner; and the uniaxially absorbing polarizing structure having a local absorption axis and disposed one of on the combiner to define the first surface, or within the combiner between the first surface and the back surface, the local absorption axis being substantially aligned at each point with the propagation direction of the external scene image transmitted through the combiner toward a design eye point for the head-up display system, the combiner configured to reflect from the first surface a first portion of the polarized light from the image generation system toward the design eye point for the head-up display system, and the uniaxially absorbing polarizing structure configured to substantially absorb a second portion of the polarized light from the image generation system.

In another exemplary embodiment, a head-up display system, comprises a combiner comprising a transparent layer having a first surface and a second surface and configured to allow a first image to pass therethrough in a first direction; and a polarizing layer disposed on one of the first surface or within the transparent layer, the first surface defining a tangential plane at each point of the surface, and the polarizing layer having a uniaxial absorption axis at a non-zero angle with respect to the tangential plane, thereby configured to suppress a refracted image created by a polarized image passing through the transparent layer and reflecting off the second surface; and a polarized image generation system configured to project the polarized image onto the combiner, wherein a reflected image and the first image are combined in the first direction.

In yet another exemplary embodiment, a method comprises projecting a polarized image from a polarized image generation system onto a polarizing structure disposed in association with a combiner, wherein a first portion of the polarized image is reflected in a first direction by a first surface of the combiner prior to reaching the polarizing structure; reducing a second portion of a refracted polarized image reflected from a second surface of the combiner by attenuating the second portion of the polarized image as it passes through the polarizing structure; and allowing a non-polarized image to pass through the combiner and the polarizing layer in the direction of the reflected first portion without being polarized by the polarizing structure.

BRIEF DESCRIPTION OF THE DRAWINGS

The present invention will hereinafter be described in conjunction with the following drawing figures, wherein like numerals denote like elements.

DETAILED DESCRIPTION

Figure 1:
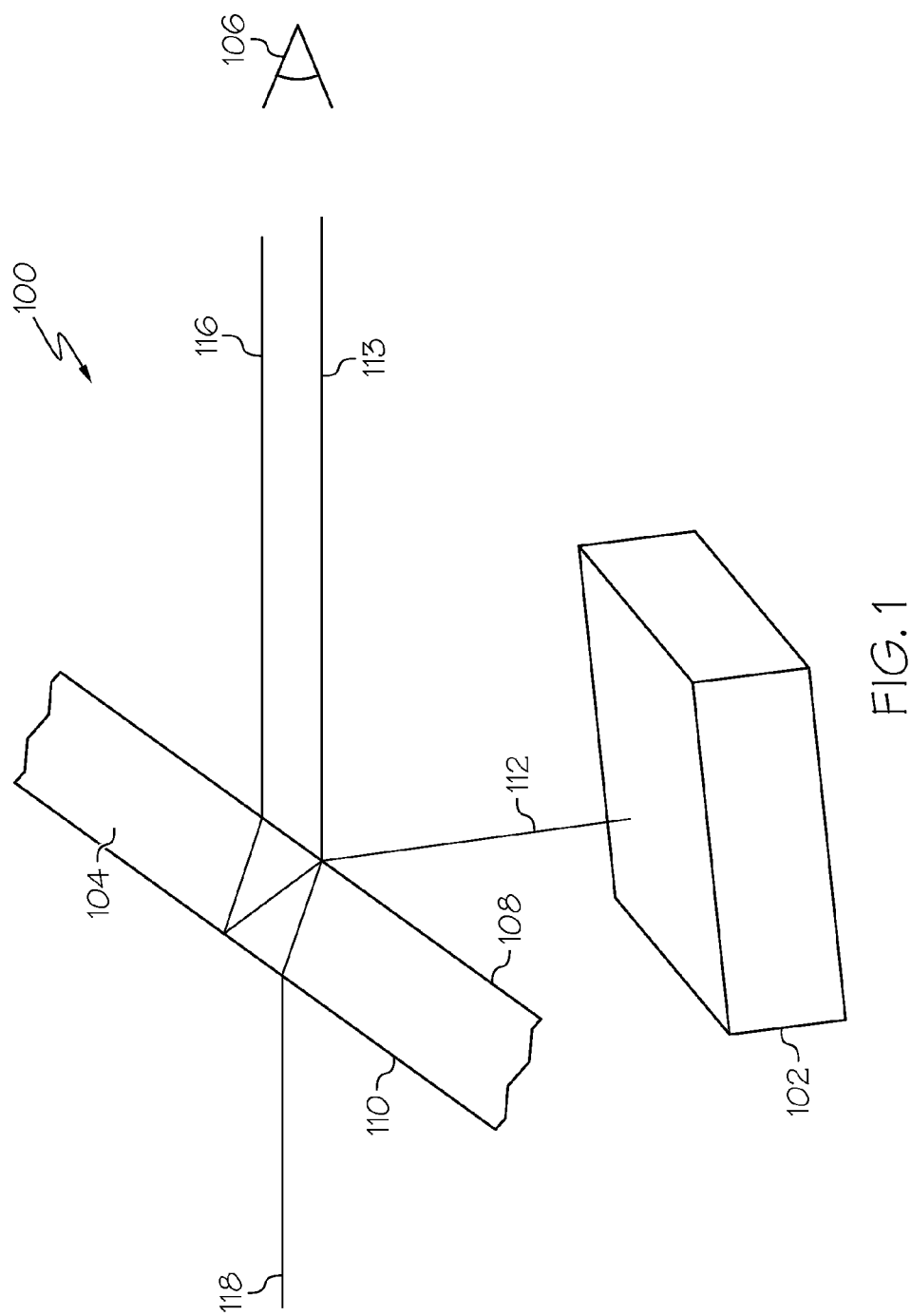
FIG. 1 is a diagram of a known HUD system suitable for use in an aircraft or other vehicle.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to optical systems, and other functional aspects of certain systems and subsystems (and the individual operating components thereof) may not be described in detail herein. It should be noted that many alternative or additional functional relationships or physical connections may be present in an embodiment of the subject matter.

Although embodiments described herein are specific to aircraft HUD systems, it should be recognized that principles of the inventive subject matter may be applied to other vehicle display systems such as HUDs in sea going vessels and automobiles, and that some or all of the images may be transmitted as frequencies other than visible light.

Techniques and technologies may be described herein in terms of functional and/or block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. It should be appreciated that the various block components shown in the figures may be realized by any number of hardware, software, and/or firmware components configured to perform the specified functions.

During the course of this description, like numbers may be used to identify like elements according to the different figures that illustrate the various exemplary embodiments.

Figure 2:
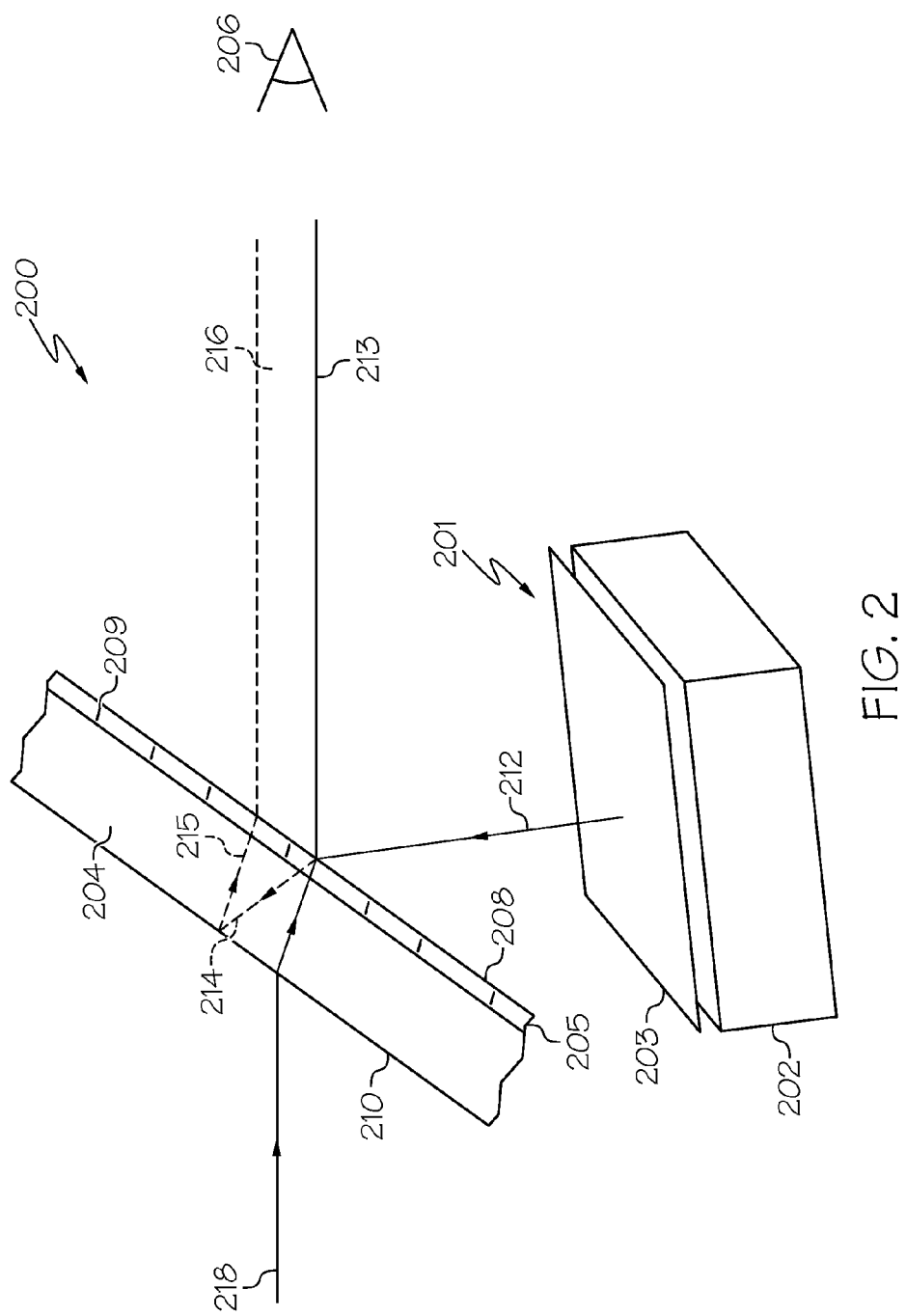
FIG. 2 is a first exemplary embodiment of a HUD system that suppresses double images.

Referring to FIG. 2, a functional block diagram of one embodiment of a HUD system 200 is depicted and includes a polarized image generation system 201, and a combiner 204 having a polarizing layer 205 positioned adjacent to a front surface 208. While the polarizing layer 205 is positioned adjacent to the front surface of the combiner 204 in this exemplary embodiment, the polarizing layer 205 may alternatively be formed or distributed elsewhere within the combiner. The polarized image generation system 201 may include, for example, a projector 202 and a polarizer (polarizing filter) 203 for projecting the polarized image 212.

In this exemplary embodiment, the combiner 204 is a windscreen in an aircraft; however, in other exemplary embodiments, the combiner 204 may be a transparent layer that may be used for other purposes other than to deflect wind. In accordance with the exemplary embodiments, the combiner 204 may be implemented using any one of numerous known combiners, or combiners hereinafter developed, suitable for rendering textual, graphic, and/or iconic information in a format viewable by the operator. For example, further benefits of the described configurations can be considered in addition to the benefits described for HUD use.

The projector 202 may be variously configured to implement its function of projecting information desired by the user, for example, information relating to flight parameters or conditions when used in an aviation environment. Specifically, the HUD system 200 may be configured to process the current flight status data for the host aircraft. In this regard, the sources of flight status data generate, measure, and/or provide different types of data related to the operational status of the host aircraft, the environment in which the host aircraft is operating, flight parameters, and the like. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc.

It will be appreciated that the projector 202 may be variously implemented and may be conformal-capable. The term "conformal-capable" as used herein indicates that the described embodiment(s) can be configured to display imagery which is substantially conformal to a forward scene observable through the combiner or other image combiner element, although the system may also be used in non-conformal modes and applications as well as configurations with little or no see-through to an outside scene.

The polarizer 203 is positioned over or otherwise combined with the projector 202 for polarizing the electromagnetic radiation of an image 212. Alternately, the polarizer 203 may be omitted if the polarized image 212 is inherently polarized by the polarized image generation system 201. While the preferred polarizer 203 is a uniaxial absorbing polarizer element, this is not intended to be limiting and other types of polarizing elements (e.g., reflective, dielectric, and beam splitting polarizers, wire-grid polarizers, or combinations of cholesteric polarizers with appropriate quarter-wave retardation films) can be used for the polarizer 203.

It should be understood that FIG. 2 is a simplified representation of a display system 200 for purposes of explanation and ease of description, and FIG. 2 is not intended to limit the application or scope of the subject matter in any way. In practice, the display system 200 may include numerous other devices and components, either alone or in combination with additional systems, for providing additional functions and features, as will be appreciated in the art.

In accordance with the exemplary embodiments, the apparatus and method described herein leverage the fact that polarization in general is a three-dimensional parameter rather than a two-dimensional parameter. FIG. 2 is an exemplary embodiment wherein light 218 (which may be referred to as an outside view) from a forward exterior scene, and having arbitrary polarization, is transmitted through the combiner 204 toward the eye 206, and is combined with the reflected image 213. An image 212 from the polarized image generation system 201 (collimation optics are optional) is directed toward the combiner 204 and a first portion of the image 212 is reflected as the image 213 (combined with the outside view 218) toward the eye 206. A second portion 214 ("refracted ray") enters the combiner and part 215 of that is reflected by the back surface 210 of the combiner. This refracted ray 214 which then becomes the reflected ray 215 may proceed toward the eye as a potential double image, ray 216; however, the invention described herein eliminates, or substantially reduces, the second portion 214, 215, 216, and therefore the double image as discussed hereinafter. It should be noted that while the various figures show the reflecting surface or component of the combiner 204 as being the front surface 208, there could optionally be additional layers on the front surface. It is not required that the front, or reflecting, surface of the combiner be an exterior surface that interfaces to air, though the embodiments as disclosed assume that the rays associated with image 212 will reach that front, or reflecting, surface prior to reaching polarizing layer 205.

While FIG. 2 traces the path(s) of a single ray from the display, the present invention works well with multiple image problems. For an example having multiple images, see FIG. 2 of U.S. Pat. No. 5,013,134, which shows how two rays emitted from a common point on an (uncollimated) image can end up on separate positions on the viewer's retina. That patent also teaches a tapered windshield approach (see FIG. 6) which allows superimposing the ghost image on top of the primary image, at least to some degree over a certain range of angles and positions. Another well-established special case where double images are superimposed and overlay each other is in the case of well-collimated imagery reflecting from flat and parallel surfaces.

The embodiment of FIG. 2 addresses the multiple image issue by including a polarizing layer 205 having a tilted axis 209 (represented by the short parallel lines). For a uniaxial absorbing axis within this combiner 204, any light with a propagation direction substantially aligned with the tilted axis 209 is not absorbed, since both polarization axes of the light are orthogonal to the tilted axis 209. The tilted axis 209 is oriented at a non-zero angle with respect to the plane of the polarizing layer 205 (or, if curved, the local plane or tangent plane associated with the polarizing layer in that particular vicinity or location).

However, the refracted ray 214 from the polarized image generation system 201 can have at least a portion of its light polarized along, i.e. the electric field is not orthogonal to, the tilted axis 209 and is thereby attenuated by the tilted axis 209. By suitably adjusting the output polarization of the polarized image generation system 201, e.g. favoring P-polarization at the combiner, as well as the polarizing efficiency of the tilted axis 209, the second surface 210 reflection 216 can be effectively reduced or eliminated.

In accordance with another exemplary embodiment, the tilted axis polarizer 205 is an element that is applied to the combiner 204 as in FIG. 2. The tilted axis polarizer 205 could be permanently laminated, or alternately could be an applied film, covering the viewing area of the combiner 204, or optionally a larger area of the combiner 204.

Figure 3:
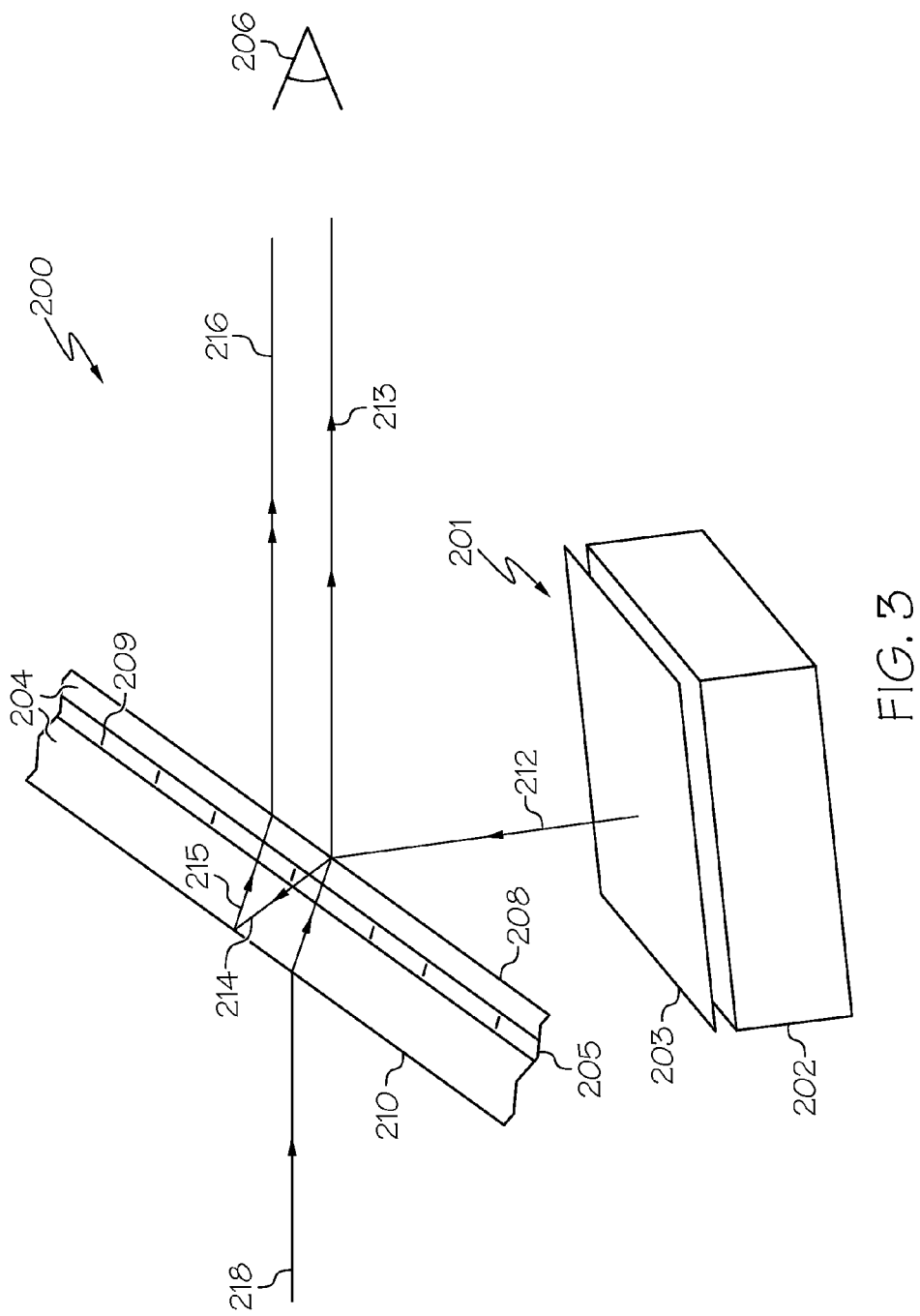
FIG. 3 is a second exemplary embodiment of a HUD system that suppresses double images.

An exemplary embodiment of FIG. 3 comprises the polarizer 205, with its tilted axis 209, immersed within the combiner 204, for example inside of a multi-layer combiner 204.

Figure 4:
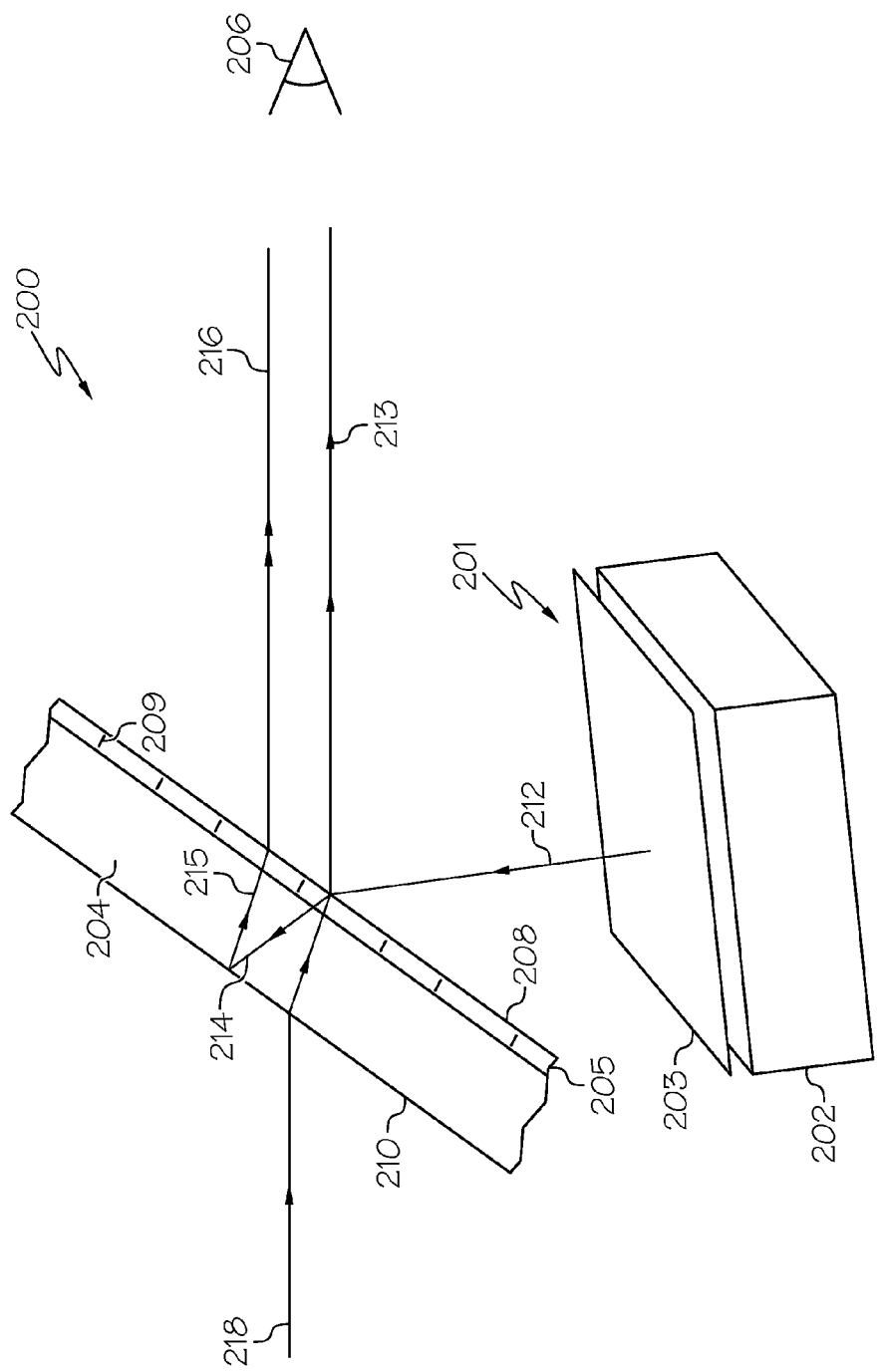
FIG. 4 is a third exemplary embodiment of a HUD system that suppresses double images.

In still another exemplary embodiment, the tilted axis 209 could be normal to the local plane of the polarizing layer 205 (see FIG. 4 wherein the short parallel lines 209 are perpendicular to the polarizing layer 205 plane), i.e., a homeotropic axis or z-axis, which is not fully aligned with the internal propagation angles for the outside view, provided that the outside view attenuation from the design eye point (DEP) remains acceptable. While both the outside view 218 and the reflection 215, if any, of refracted ray 214 would see some slight attenuation by the layer 205, the refracted ray 214 could still undergo substantial attenuation, depending of course upon the detailed reflection and refraction angles involved.

Figure 5:
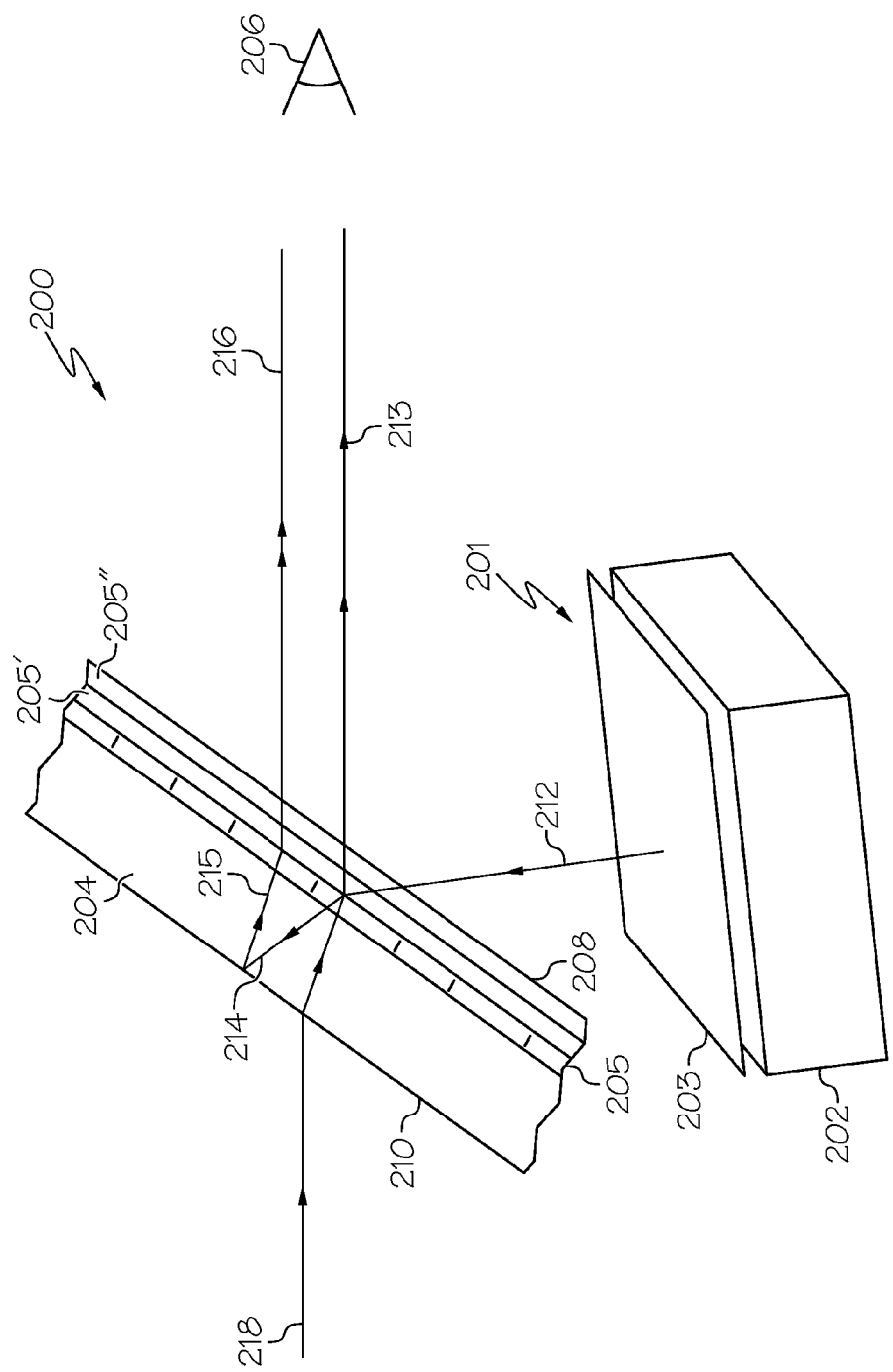
FIG. 5 is a fourth exemplary embodiment of a HUD system that suppresses double images.

Additional coatings could be incorporated into/onto the film or combiner to selectively modify which wavelengths or polarizations are preferentially reflected by the desired reflection surface. Referring to FIG. 5, the combiner 204 includes coatings 205', and 205" in addition to polarizing layer 205. This may be desirable, especially if the polarized image generation system 201 image 212 is P-polarized for the combiner 204 reflection. Alternately, polarization retardation layers 205', 205" could be used, for example, to reflect incident light having S-polarization, but then rotating the polarization of refracted rays to be more effectively absorbed. Similarly, retardation layers could be added between tilted axis polarizer 205 and the rear surface 210 of combiner 204 to rotate the polarization of light passing through that region within the HUD system 200.

Figure 6:
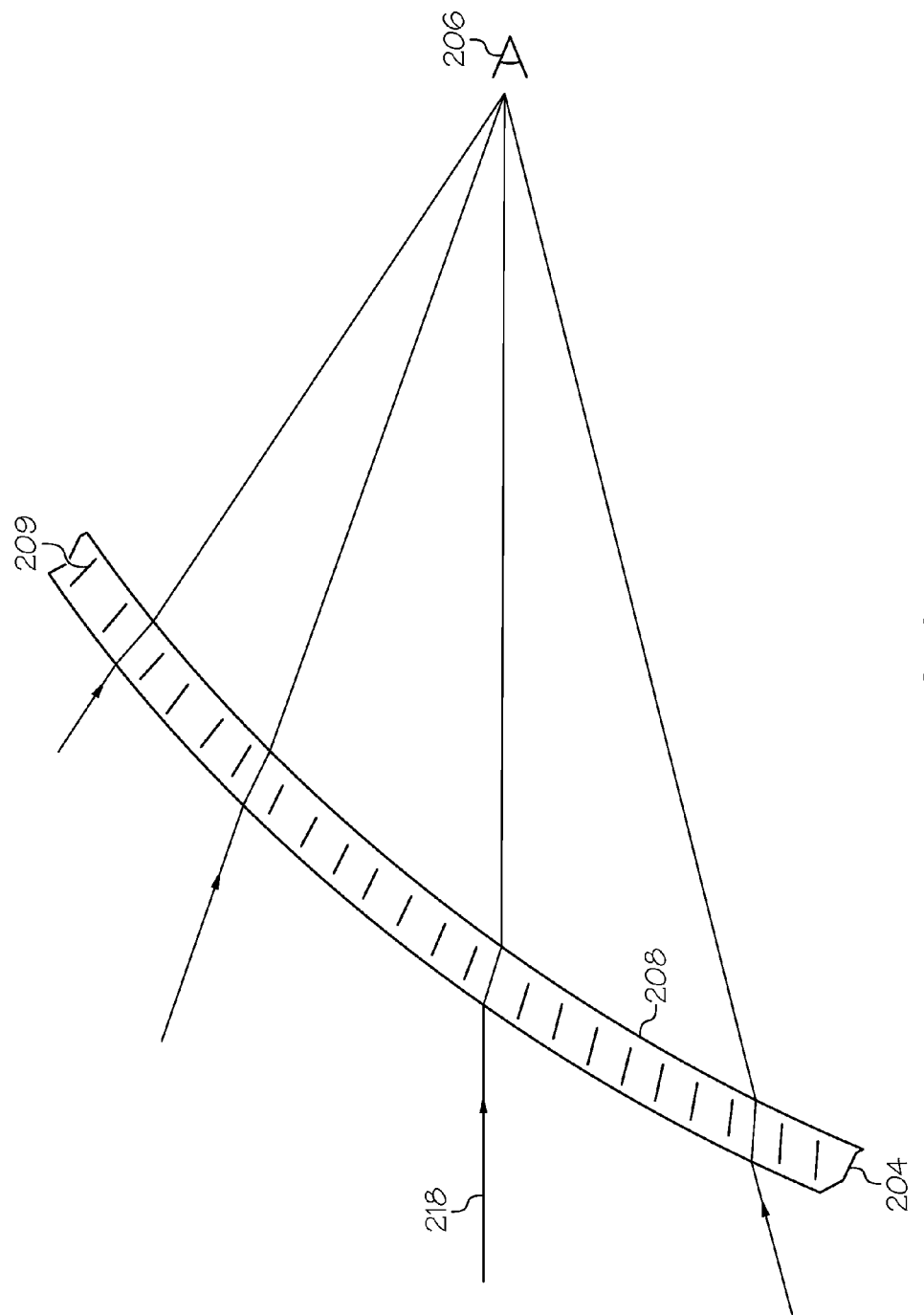
FIG. 6 is an exemplary embodiment of a combiner that suppresses double images.

Referring to the exemplary embodiment of a curved combiner shown in FIG. 6, the tilt of the polarizing axis 209 could be varied across the area of the combiner 204 such that its axis is aligned with the line of sight for a range of angles from the DEP. A similar variation could also be applied in the case of a flat combiner as depicted in several earlier figures.

Besides depicting a single polarizing layer having tilted uniaxial orientation, the diagram of FIG. 6 can also be interpreted to portray an additional embodiment which utilizes conventional polarizer technology. Rather than interpreting the short lines within the polarizing layer as a tilted absorption axis, those lines could represent conventional polarizer sheets or sections immersed within a bulk layer. As one example, such a bulk layer could be several millimeters thick. Additional supporting layers, such as glass, are likely present as well, though not shown in FIG. 6 or 7. While such polarizer sections will absorb a portion of the incident light having polarization which is not orthogonal to the linear axes as shown, they will remain substantially transparent to the viewer's eye since each of those ray directions will have both polarizations substantially normal to the linear axes as shown. This embodiment allows suppression of the multiple reflections using conventional polarizers, but at the same time preserves the high transmittance, for example, greater than 80% transmittance, typically required of HUDs in certain applications such as aircraft pilotage. Of importance would be to carefully index-match the materials and to avoid air pockets which could lead to distracting visual artifacts. The viewing geometry should adequately match the design eye point (DEP) line-of-sight arrangement to prevent visual artifacts. Here, the DEP is considered to be the nominal location for the pilot's eye 206 when viewing the outside scene.

Depending upon the thickness and detailed projection geometry, this "stacked" conventional polarizer structure can potentially be fairly sparse, with an appreciable separation between the stacked layers.

This alternate configuration can be interpreted even more broadly by assuming that the absorbing axes of the conventional sheets or sections are normal to the page, such that they would preferentially absorb incident rays having S-polarization. In this case, however, it will be even more important that the layers match the DEP line-of-sight to avoid the appearance of bright and darker bands in the combiner transmittance of the outside forward scene.

Still referring to FIG. 6 and in yet another exemplary embodiment, each of the stacked layers could include crossed polarizers, which would substantially absorb both polarizations refracting into said layer. A simpler method for achieving this would be for the immersed and stacked layers, or even fibers, to be quite thin and deeply tinted or even opaque black, without the need for polarizer-type functionality. This would be somewhat analogous to the use of extramural absorption (EMA) material in fiber optic faceplates to reduce off-axis propagation, immersed louvers to reduce off-axis throughput, or similarly Soller slits as used within X-ray collimators, but with notable distinctions in terms of the useful embodiment(s) in conjunction with the front surface HUD reflection. As with the stacks described above which absorb S-polarization, the alignment tolerances would be necessarily tight if high transmittance and minimal transmittance modulation of the DEP line-of-sight are important.

Figure 7:
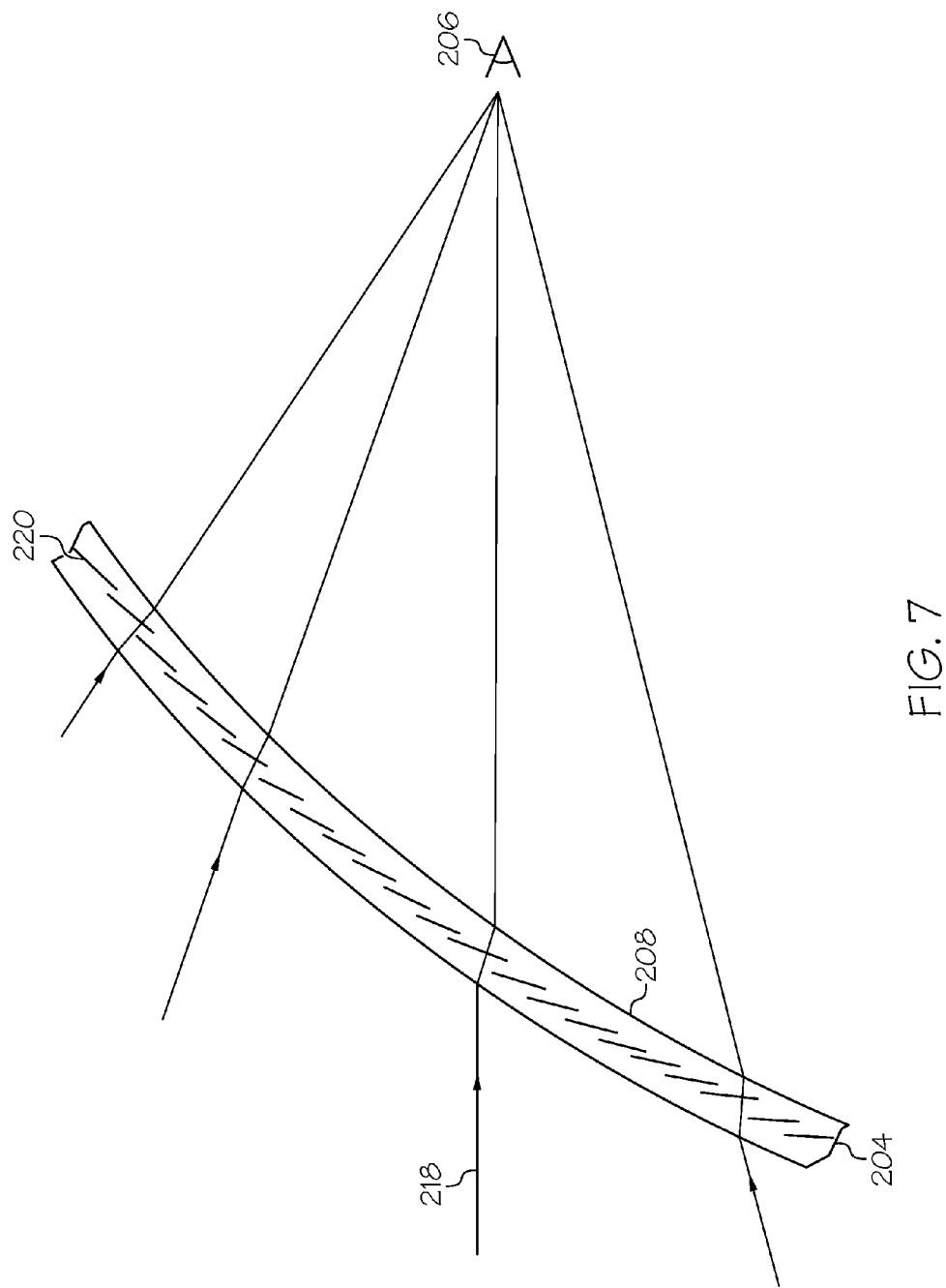
FIG. 7 is another exemplary embodiment of a combiner system that suppresses double images.

Referring to FIG. 7, the adjusted tilt angles of, for example FIG. 6, could also be achieved by using sections or sheets 220 of a homeotropic polarizer. In this case, the individual sheets would be rotated approximately ninety degrees relative to the case of conventional polarizer sections in FIG. 6 such that the homeotropic absorbing axis of each section would align substantially with the nominal line of sight at that location. In such a case, it would be preferable to stagger or overlap the sections such that there are no apparent gaps in coverage for the refracted rays.

The polarizing layer (or related polarizing structure, several of which have been disclosed herein) 205 would be effective for use on either a dual-purpose windscreen/combiner, or a combiner that is separate from the windscreen or windshield. In the case of it being a separate element, there would typically be another transparent windscreen structure proximate and to the left of the combiner 204 in the various FIGS. 2 through 7, though not explicitly shown. Depending upon the relative angles between such a separate windscreen and the combiner, the windscreen could potentially contribute additional multiple reflections of the HUD imagery, but the present invention would attenuate or eliminate those reflections as well since it functions by attenuating the rays before they would reach such a separate windscreen, if present.

While FIGS. 1-7 show various flat and curved combiner regions, it should be understood that alternate combiner curvatures can be considered as well. For example, when reference is made to a "plane" defined by a surface, a corresponding interpretation for a curved surface would be a local plane or tangent plane for that point being referenced.

In a preferred embodiment, the tilted axis structure is photometrically stable, for example, by the use of highly stable dichroic dye(s), or iodine-based structures (as in most conventional polarizing films). However, various embodiments are possible for fabricating such a polarizer having a tilted absorption axis, including an absorption axis whose tilt varies.

As an example, various methods for modifying the tilt angle from homeotropic are possible, such as the use of fixed or variable applied fields during the crosslinking (or drying) of an orientable host material containing suitable dichroic guest dye/absorbing materials.

An alternate method for achieving or modifying tilt could be through the use of mechanical shear forces as applied to substantially homeotropic polarizing films. The shear forces could be applied locally or across a large film area. Yet another is by making the film to conform with a particular surface.

Another significant benefit of the present invention is that it does not rely upon the characteristics of the reflection by the exterior surface 210, since it attenuates the refracted rays 214 before reaching that exterior surface 210. For example, a mist or rain on the exterior surface 210 could lead to diffuse scatter of HUD light 212 (as the refracted rays 214) that reaches it, but this disclosed approach would attenuate such light 214 before reaching that exterior surface 210.

The methods described herein may of course be used in conjunction with other methods, known or not yet described, for reducing the undesired reflections that impact the effectiveness and/or clarity of the viewed image.

Figure 8:
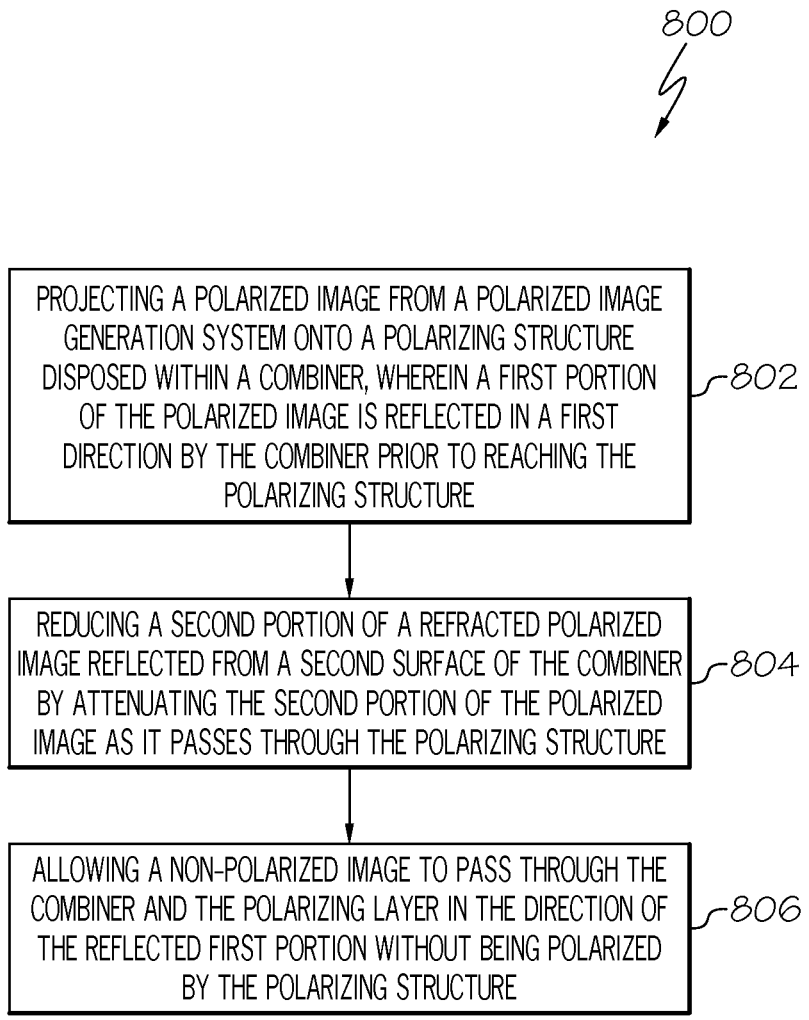
FIG. 8 is a flow diagram of an exemplary method in accordance with the exemplary embodiments.

FIG. 8 is a flow chart that illustrates an exemplary embodiment of a method 800 suitable for use with a display system, for example, a flight deck display or automobile display. For illustrative purposes, the following description of method 800 may refer to elements mentioned above in connection with preceding FIGS. It should be appreciated that method 800 may include any number of additional or alternative tasks, the tasks shown in FIG. 8 need not be performed in the illustrated order, and method 800 may be incorporated into a more comprehensive procedure or method having additional functionality not described in detail herein. Moreover, one or more of the tasks shown in FIG. 8 could be omitted from an embodiment of the method 800 as long as the intended overall functionality remains intact.

In accordance with the exemplary method of FIG. 8, the method 800 comprises projecting 802 a polarized image from a polarized image generation system onto a polarizing structure disposed within a combiner, wherein a first portion of the polarized image is reflected in a first direction by the combiner prior to reaching the polarizing structure; reducing 804 a second portion of a refracted polarized image reflected from a back surface of the combiner by attenuating the second portion of the polarized image as it passes through the polarizing structure; and allowing 806 a non-polarized image to pass through the combiner and the polarizing layer without being polarized by the polarizing structure.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A head-up display system for overlaying a projected image onto an external scene image, the head-up display system comprising:
    a combiner having a first surface and a second surface and including a uniaxially absorbing polarizing structure;
    a polarized image generation system configured to project polarized light onto the combiner; and
    the uniaxially absorbing polarizing structure having a local absorption axis and disposed on the combiner to define the first surface, or within the combiner between the first surface and the second surface, the local absorption axis being normal to the first surface, the combiner configured to reflect from the first surface a first portion of the polarized light from the image generation system toward a design eye point for the head-up display system, and the uniaxially absorbing polarizing structure configured to substantially absorb a second portion of the polarized light from the image generation system.

2. The head-up display system of claim 1 wherein the uniaxial absorption axis is parallel to an internal propagation vector through the combiner for the external scene image directed toward the design eye point.

3. The head-up display system of claim 1 wherein the uniaxially absorbing polarizing structure has greater than 50%, transmittance at each visible wavelength for rays propagating from the external scene toward the design eye point.

4. The head-up display system of claim 1 wherein the uniaxially absorbing polarizing structure has greater than 70% transmittance at each visible wavelength for rays propagating from the external scene toward the design eye point.

5. The head-up display system of claim 1 wherein the uniaxial absorption axis is at a non-zero angle with respect to planes defined by the first and second surface.

6. The head-up display system of claim 1 further comprising at least one reflectance modifying film disposed between the uniaxially absorbing polarizing structure and the first surface.

7. The head-up display system of claim 1 further comprising at least one polarization modifying film disposed between the uniaxially absorbing polarizing structure and the first surface.

8. The head-up display system of claim 1 wherein the combiner is positioned proximate a vehicular windscreen.

9. The head-up display system of claim 1 wherein the combiner is a vehicular windscreen.

10. The head-up display system of claim 1 wherein the uniaxially absorbing polarizing structure is a polarizing layer having a homeotropic absorbing axis.

11. The head-up display system of claim 1 wherein the uniaxially absorbing polarizing structure comprises one or more polarizer sections.

12. The head-up display system of claim 1 wherein the combiner is flat.

13. The head-up display system of claim 1 wherein the combiner is curved.

14. A head-up display system, comprising:
    a curved combiner comprising:
        a transparent layer having a concave first surface and a convex second surface and configured to allow a first image to pass therethrough in a first direction; and
        a polarizing layer disposed on the concave first surface, the concave first surface defining a tangential plane at each point of the surface, and the polarizing layer having a uniaxial absorption axis at a non-zero angle with respect to the tangential plane, thereby configured to suppress a refracted image created by a polarized image passing through the transparent layer and reflecting off the convex second surface; and
    a polarized image generation system configured to project the polarized image onto the combiner, wherein a reflected image and the first image are combined in the first direction.

15. An optical window having an associated design eye point, comprising:
    a light transmitting element having a first surface and a second surface; and
    a polarizing structure disposed within the light transmitting element between the first surface and the second surface, the polarizing structure having a plurality of overlapping polarizer sections each having an absorption axis depending on a position within the light transmitting element; wherein the light transmitting element and polarizing structure are configured to:

pass light of arbitrary polarization through the first surface, second surface and design eyepoint without its polarization being substantially changed by the polarizing structure; and pass light through the first surface, second surface and polarizing structure but not the design eyepoint such that it is at least partially polarized and attenuated by the polarizing structure.

16. The optical window of claim 15, further comprising:
a polarized projector; wherein
a portion of the light rays exiting the projector are reflected by the optical window toward the design eye point prior to reaching the polarizing structure; and
the portion of the light exiting the projector that reaches the polarizing structure is substantially absorbed by the polarizing structure.

17. The head-up display system of claim 14, wherein the uniaxial absorption axis of the polarizing layer varies across an area of the concave first surface.

18. The head-up display system of claim 17, wherein the uniaxial absorption axis of the polarizing layer is normal relative to the tangential plane of the concave first surface across the area.

* * * * *